US009256752B2

(12) United States Patent
Golac et al.

(10) Patent No.: US 9,256,752 B2
(45) Date of Patent: Feb. 9, 2016

(54) PRODUCT AUTHORIZATION WITH CROSS-REGION ACCESS

(71) Applicant: Microsoft Technology Licensing, LLC, Redmond, WA (US)

(72) Inventors: Davor Golac, Seattle, WA (US); Myron Wan, Sammamish, WA (US); Larry Leach, Renton, WA (US); Sunil Bhalla, Redmond, WA (US); David Daly, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 14/149,759

(22) Filed: Jan. 7, 2014

(65) Prior Publication Data
US 2015/0193632 A1    Jul. 9, 2015

(51) Int. Cl.
*H04L 9/00* (2006.01)
*G06F 21/62* (2013.01)
*G06F 21/10* (2013.01)

(52) U.S. Cl.
CPC ............. *G06F 21/62* (2013.01); *G06F 21/10* (2013.01); *G06F 2221/0708* (2013.01)

(58) Field of Classification Search
CPC ....... H04L 63/20; H04L 63/107; G06F 21/10; G06F 21/105; G06F 21/121; G06F 21/123; G06F 21/44; G06F 21/60; G06F 21/62; G06F 2221/2111
USPC ........... 726/1, 26–30; 713/168, 193; 380/258; 705/51, 57–59
See application file for complete search history.

(56) References Cited

U.S. PATENT DOCUMENTS

| 6,138,009 | A  | * | 10/2000 | Birgerson | ................ | 455/419 |
| 6,574,732 | B1 | * | 6/2003  | Steinberg et al. | ............. | 713/193 |
| 7,519,561 | B2 | * | 4/2009  | Boomershine et al. | ....... | 705/400 |
| 7,627,753 | B2 | * | 12/2009 | Whitten et al. | ............... | 713/161 |
| 8,218,766 | B2 | * | 7/2012  | Sahai | ............................ | 380/258 |
| 2003/0065571 | A1 | | 4/2003 | Dutta | | |
| 2005/0021467 | A1 | | 1/2005 | Franzdonk | | |
| 2006/0059100 | A1 | | 3/2006 | Ronning et al. | | |
| 2007/0260550 | A1 | | 11/2007 | Pieper et al. | | |
| 2010/0024017 | A1 | | 1/2010 | Ashfield et al. | | |
| 2010/0235279 | A1 | | 9/2010 | Bouchard et al. | | |

(Continued)

FOREIGN PATENT DOCUMENTS

WO    2013054350 A2    4/2013

OTHER PUBLICATIONS

International Search Report & Written Opinion for PCT Application No. PCT/US2014/070691, Mailed Date: May 19, 2015, 11 Pages.

(Continued)

*Primary Examiner* — Hosuk Song
(74) *Attorney, Agent, or Firm* — Tom Wong; Micky Minhas

(57) ABSTRACT

A method and system for authorizing access to a product to limit suspected cross-region access is provided. The system receives from a customer device a product key that identifies a product and a product region. The system identifies a customer region indicating where the customer device is located. The system authorizes the customer's access to the product unless the product region does not match the customer region and the blocking of access is confirmed by applying a blocking rule so that access to the product is authorized even though a cross-region access is suspected.

20 Claims, 4 Drawing Sheets

(56) References Cited

U.S. PATENT DOCUMENTS

| | | |
|---|---|---|
| 2011/0099037 A1 | 4/2011 | Levin et al. |
| 2012/0054001 A1 | 3/2012 | Zivkovic et al. |
| 2012/0265593 A1 | 10/2012 | Etheredge et al. |
| 2013/0053057 A1 | 2/2013 | Cansino et al. |
| 2013/0204690 A1 | 8/2013 | Liebmann |

OTHER PUBLICATIONS

Singh, Nirvikar, "Chapter 14: Pricing", In Proceedings of Electronic Commerce: Economics and Strategy, Mar. 23, 2000, 16 pages.

* cited by examiner

PRODUCT AUTHORIZATION WITH CROSS-REGION ACCESS

BACKGROUND

The sale of new products has traditionally been through brick-and-mortar channels. To purchase a product, a customer typically travels from their home or work, to a store, selects the product, pays for the product, travels back to their home or work, and then uses the product at their home or work. Because customers physically need to travel to a store, the geographic region serviced by a store is typically constrained because customers will, with all other things being equal, travel to the closest store to purchase a product. The geographic region serviced by a store may also be constrained by governmental regions that are defined by governmental organizations, such as country, state, county, or city, as certain products may only be adapted to operate under the rules of such governmental organizations. For example, because different countries supply electricity at different voltages (e.g., 120v or 240v), a product sold in one country may not work in a different country. Even if a product could be used in a different region, the customer experience may be adversely impacted as the product may be adapted to the language, customs, and so on, of a particular region.

Product suppliers (e.g., retailers and manufacturers) may price a product differently for different regions (i.e., geographic regions and governmental regions) for various reasons. For example, a retailer who wants to attract new customers to a new store or keep existing customers in face of stiff competition may price a product at a low price in a certain region. As another example, a product supplier may want to price a product higher in regions with a high cost of doing business. Factors that may influence the cost of doing business include the cost of complying with government regulations, tax rates, currency exchange rates, the cost of living, the cost of product liability insurance, and so on.

Assuming that a product sold in one region can be used in another region, customers in a region in which a product is sold at a high price may travel to and purchase the product in a region where the product is sold at a low price. When pricing a product in a low-price region, a product supplier may factor into the price the revenue that may be lost from high-price regions because of sales in a low-price region.

Although cross-region purchasing has been somewhat of a problem for product suppliers, the problem has been traditionally limited to near-region boundaries because the cost of the time and travel may outweigh the cost savings of the lower price. The problem can even be limited when a product is sold via electronic commerce because the web pages serving in different regions can have prices that are appropriate to that region, and the product supplier can constrain shipment of a product to only the region where the product was purchased.

The problem is, however, not so limited for digital products such as computer programs, music, and video, which may be distributed on DVD or CD or electronically. For example, when a customer purchases a computer program from a brick-and-mortar retailer or through an electronic commerce retailer, the customer may be provided with a product key. A product key is typically a sequence of 16 (4-by-4) or 25 (5-by-5) alphanumeric characters. The product key is evidence that the customer purchased the product. To use the product, the customer may need to provide that product key electronically (e.g., via the Internet) to an authorization system so that the product key can be verified and access authorized. In the case of a DVD or CD, the authorization may result in a code being provided to the customer's computer so that the product can be used on that computer. In the case of electronic distribution, the authorization may allow the product to be downloaded to the customer's computer or allow the customer to set up and account to access the product as an on-line service (e.g., via a cloud).

One difficulty with the distribution of digital products is that it is relatively inexpensive to ship DVDs or CDs and essentially free to send product keys between regions. As a result, software products sold in one region may easily be accessed and used in a different region. Such cross-region use may result in loss of revenue for the product supplier, adverse user experiences, violation of governmental regulations, and so on.

SUMMARY

A method and system for authorizing access to a product to limit suspected cross-region access is provided. In some embodiments, the system receives from a customer device a product key that identifies a product and a product region and receives a customer address related to the customer device. The system identifies the customer's region from the customer address, which indicates the region in which the customer device is located. The system authorizes customer access to the product unless the product region does not match the customer region and blocking of access is confirmed by applying a blocking rule so that access to the product is authorized even if a cross-region access is suspected. A blocking rule may indicate to not block access when the confidence that the customer region has been correctly identified is below a threshold confidence level.

DETAILED DESCRIPTION

Figure 1:
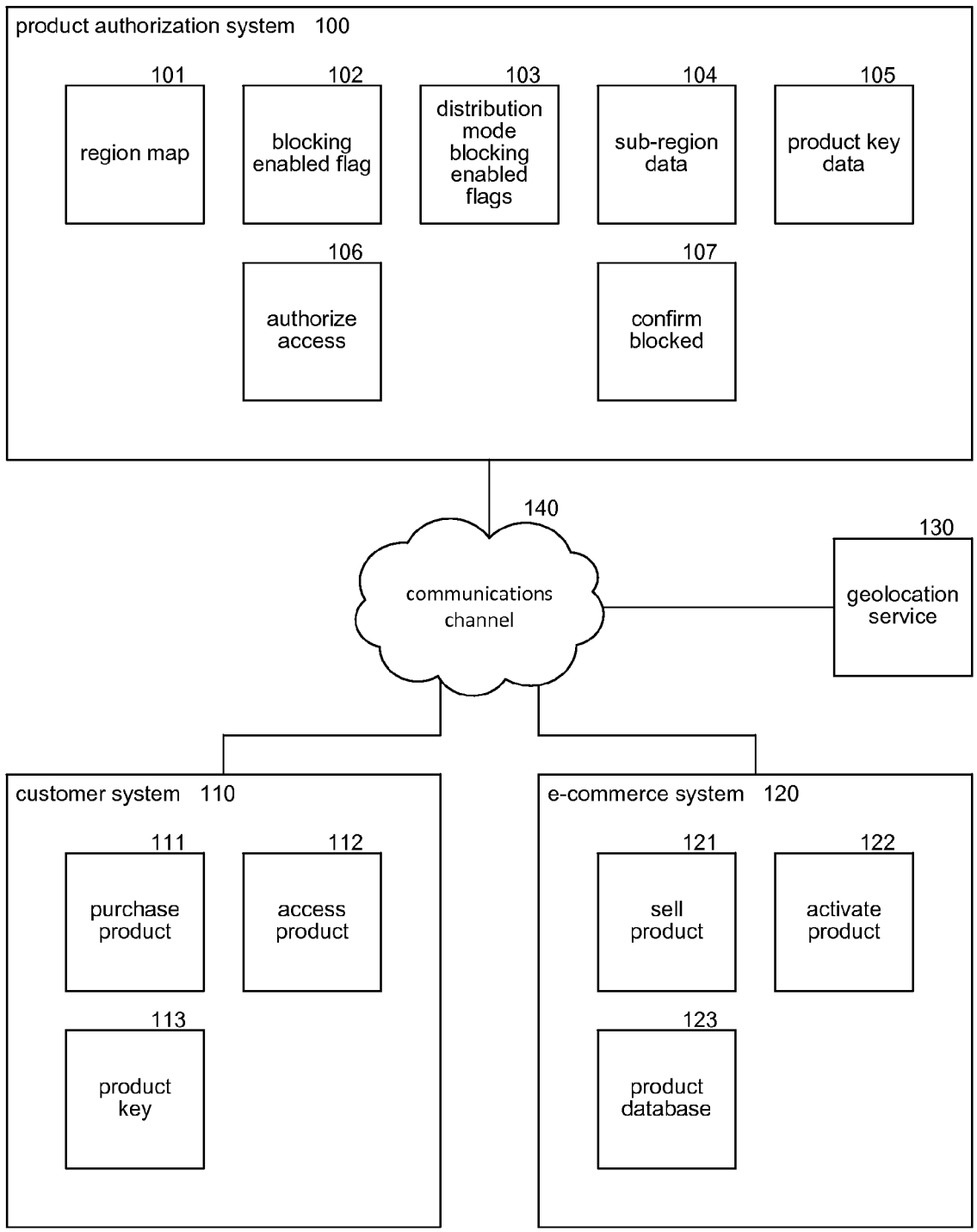
FIG. 1 is a block diagram that illustrates the product authorization system and its interactions with other systems in some embodiments.

A method and system for authorizing access to a product by a customer to limit cross-region access is provided. Cross-region access refers to the acquisition (e.g., purchase) of a product meant to be used in one region while using the product in a different region. In some embodiments, a product authorization system receives from a customer device (e.g., a computer) a product key that is unique to each purchase of a product. The product and the product region can be identified from the product key. The product region is the region in which the product is to be used as specified by a supplier of the product. The product authorization system then receives a customer address for the customer device. The customer address may be, for example, an Internet Protocol ("IP") address. The product authorization system then identifies a customer region from the customer address. The customer region indicates the region in which the customer device is located.

The product authorization system may use one of many geolocation services that when provided with an IP address returns the geographic location associated with that IP address along with a confidence score. The confidence score indicates how confident the geolocation service is that the returned geographic location is the location where the device with that IP address is actually located. The product authorization system then determines whether the product region matches the customer region.

If the product region matches the customer region, no cross-region access is being attempted and the product authorization system authorizes the customer's access to the product. Once access is authorized, the customer can access the product. If the product has already been installed to the customer device, the authorization would allow the customer to use the product. Authorization may also enable the product to be copied to a customer device (e.g., from a DVD or a server) and then used. The authorization may also enable the customer to use a product that is stored on a server (e.g., in the cloud).

When the product region does not match the customer region, then cross-region access may be occurring. The product authorization system then applies blocking rules to determine whether the customer's access to the product should be blocked. For example, a blocking rule may be that access should only be blocked if the customer region can be identified with a threshold degree of confidence. If a product supplier is not very confident that the customer region is correct, then the product supplier may not want to block access for fear of alienating a customer whose device is actually in the same region as the product region. Upon determining that a customer's access should be blocked, the product authorization system blocks the customer's access to the product. Otherwise, the product authorization system authorizes the customer's access to the product.

In some embodiments, the product authorization system defines a region to be a collection of sub-regions. For example, the product authorization system may define regions such as Latin America, Europe, Middle East, and Asia Pacific with sub-regions that are countries. The product authorization system may alternatively define each region to be a single country with no sub-regions or with sub-regions of states, provinces, counties, and so on. The product authorization system may also define regions and sub-regions not based on a governmental organization. For example, the product authorization system could define a region or sub-region based on zip code, area code, and so on. A sub-region may also be a collection of zip codes (or other postal codes) or area codes that share a common characteristic such as geographic proximity or similar median income. The product authorization system may even define regions more abstractly such as the area near a university. A region near a university may be used to help ensure that student versions are actually used by students. In general, regions may be defined for any geographic areas in which a product supplier may want to prevent cross-region access.

In some embodiments, the product authorization system may allow for selective disablement of blocking of cross-region access. For example, certain distribution modes may be less susceptible to cross-region access, and a product supplier may not want to block even suspected cross-region access for such distribution modes. Distribution modes may include different distribution channels and distribution tenants within a distribution channel. Distribution channels include brick-and-mortar stores and electronic channels (e.g., the Internet). that may be administered by the manufacturer of the product or independent retailers or partners. Distribution tenants may include different types of brick-and-mortar stores (e.g., book store or computer store) and different types of web sites (e.g., business web site or student web site). So, the product authorization system would not block access when a product is purchased via a distribution mode that has blocking disabled. Such selective disablement may be also on a region-by-region basis or sub-region-by-sub-region basis. The product authorization system may use various rules to determine whether access should be blocked.

In some embodiments, the product authorization system may block access based on a threshold degree of confidence in the customer region that may vary over time. The product authorization system may allow a product supplier to specify that no more than a target percentage of suspected cross-region accesses should be blocked (i.e., a target goal). If more than the target percentage of cross-region accesses is being blocked, then the product authorization system may gradually increase the threshold degree of confidence until the percentage being blocked drops below the target percentage within a specified time period. For example, if the target is 5%, but 10% are being blocked, the product authorization system may increase the threshold degree of confidence from 0.95 to 0.96 for a certain period. If the percentage continues to be above 5%, the product authorization system would then increase the threshold to 0.97 and so on until the target percentage is met. The product authorization system may also allow for different threshold degree of confidences or different target percentages to be used for different regions. For example, a product supplier may believe that customers in a certain region (e.g., a border town) are more likely to engage in cross-region access. In such a case, the product supplier may specify a higher target percentage or a lower threshold degree of confidence in those regions to block more cross-region access. As another example, an Internet Service Provider might service different sub-regions with the same IP address range. In such a case, the product supplier may specify special targets or thresholds for such sub-regions.

Although the product authorization system is described primarily in the context of providing access to digital products, the product authorization system may also be used to limit cross-region access to physical products. For example, a computer manufacturer may be prohibited from selling a certain product for use in a country for various reasons. One reason may be that the product (e.g., a refrigerator) may not meet the energy efficiency standards of that country. Another reason may be that using the product in that country may be prohibited by court order. Since many products now have embedded computing devices with Internet access, a product may be programmed to automatically check whether its use in the customer country or region is authorized.

FIG. 1 is a block diagram that illustrates the product authorization system and its interactions with other systems in some embodiments. A product authorization system 100 interacts with customer system 110, an electronic commerce system 120, and a geolocation service 130. The product authorization system 100 includes a region map store 101, a blocking enabled flag 102, distribution mode blocking enable flags 103, a sub-region data store 104, and product key data store 105. The product authorization system also includes an authorize access component 106, and a confirm blocking component 107. The region map store contains a data structure that maps the various regions to their sub-regions (e.g., the Middle East includes Saudi Arabia and Yemen). The blocking enable flag indicates whether the blocking of cross-region access is enabled worldwide. If it is not enabled, the product authorization system does not block any suspected cross-region access. The distribution mode blocking enabled flags indicate whether the blocking of cross-region access is enabled for the various distribution modes. The sub-region data store contains a data structure that indicates whether blocking is supported for each sub-region and, if supported, whether blocking is enabled for that sub-region. The product key data store is a data structure that stores information associated with a product key such as the part number of the product, the product region, a blocking enabled flag, an activated flag, and sub-regions where blocking is enabled for the product key. The blocking enabled flag indicates whether blocking is enabled for that product key. The activated flag indicates whether the product key represents a legitimate product key that can be used to access the product. The activated flag for a product key would typically be set when a product supplier sells a product to a customer and provides the product key to the customer as evidence of the sale. The authorize access component determines whether a requested access is authorized. The authorize access component is provided with a product key and a customer address. The authorize access component identifies the product region from the product key data store and the customer region by providing the customer address to the geolocation service 130. If the product region and the customer region do not match, the authorize access component invokes the confirm blocking component to determine whether a suspected cross-region access should actually be blocked.

The customer system 110 includes a purchase product component 111, an access product component 112, and a product key 113. The purchase product component allows the customer to purchase a product from an electronic commerce system and store the product key as evidence of the purchase. Once the product is purchased, the customer uses the access product component to access the purchased product by providing the product key to the product authorization system.

The electronic commerce system includes a sell product component 121, an activate product component 122, and a product database 123. The sell product component interfaces with a customer to sell a product that is listed in the product database and provides a product key to the customer as evidence of the sale. The activate product component interacts with the product authorization system to indicate that the product key has been activated and the customer may now be authorized to access the product.

The computing devices on which the product authorization system or customer systems may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer system such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the product authorization system. The data transmission media is used for transmitting data via transitory, propagating signals or carrier waves (e.g., electromagnetism) via a wired or wireless connection.

The systems may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the systems may be implemented in hardware using, for example, an application-specific integrated circuit ("ASIC").

Figure 2:
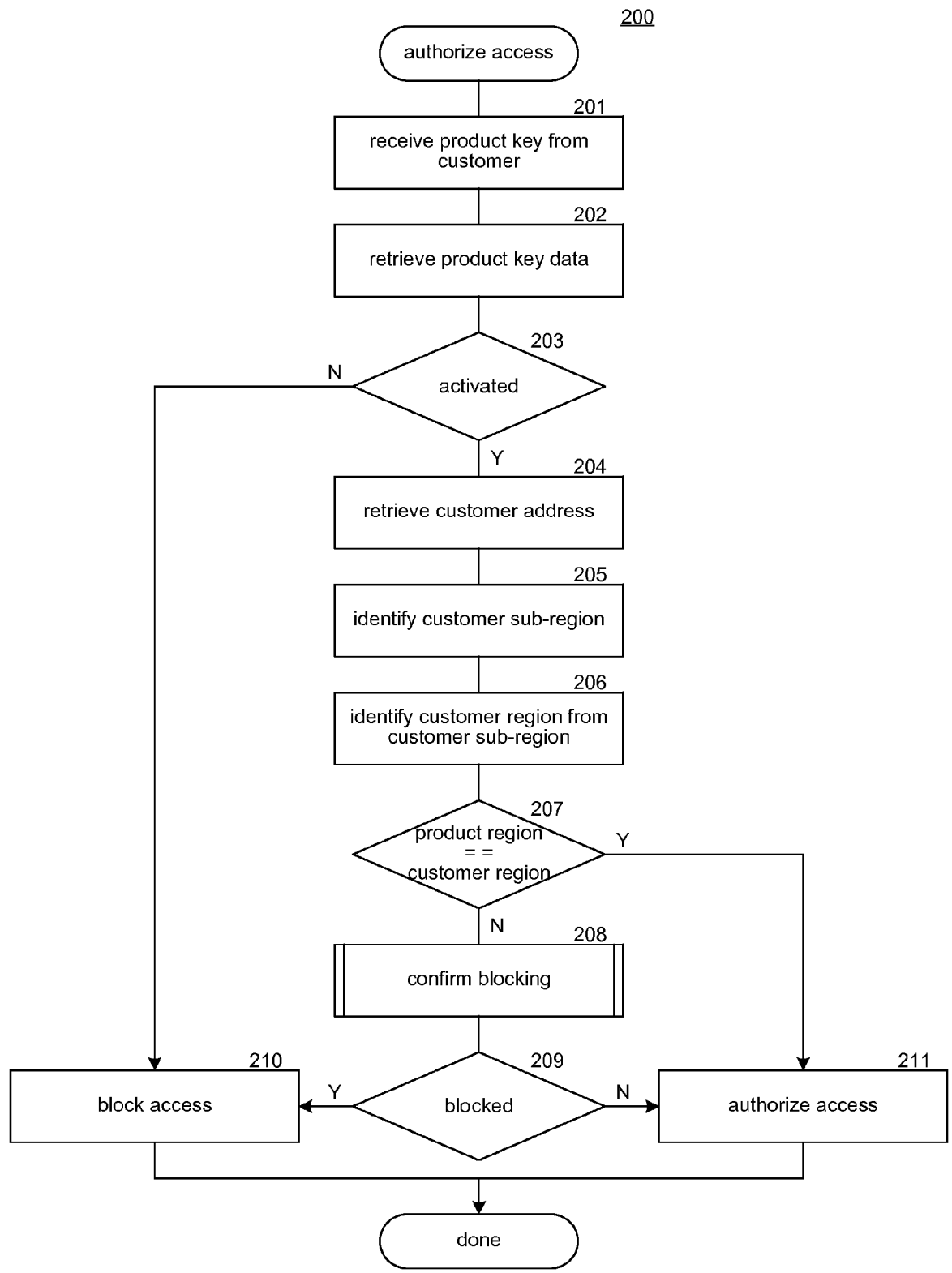
FIG. 2 is a flow diagram that illustrates the processing of the authorize access component of the product authorization system in some embodiments.

FIG. 2 is a flow diagram that illustrates the processing of the authorize access component of the product authorization system in some embodiments. The authorize access component is invoked when a customer requests access to the product identified by the product key. The component determines whether the product region and the customer region match and authorizes access when they do match. If they do not match, then cross-region access may be occurring and the component will then determine whether such access should be blocked. In block 201, the component receives the product key from the customer. In block 202, the component retrieves the data for the product key that includes an indication of the product region and the activated flag for that product key. In decision block 203, if the activated flag indicates that the product key has been activated, then the component continues at block 204, else the component continues at block 210 to block access to the product. In block 204, the component retrieves the customer address (e.g., IP address) associated with the customer device from which the product key was received. In block 205, the component identifies the customer sub-region (e.g., country) associated with the customer address by accessing the geolocation service. The geolocation service returns the customer sub-region along with a confidence score. In block 206, the component identifies the customer region from the customer sub-region using the sub-region map. In decision block 207, if the product region and the customer region match, then the component continues at block 211 to authorize access, else a cross-region access may be occurring and the component continues at block 208. In block 208, the component invokes the confirm blocking component to determine whether the suspected cross-region access should be blocked. In decision block 209, if the suspected cross-region access should be blocked, then the component blocks the access in block 210, else the component authorizes the access in block 211. The component then completes.

Figure 3:
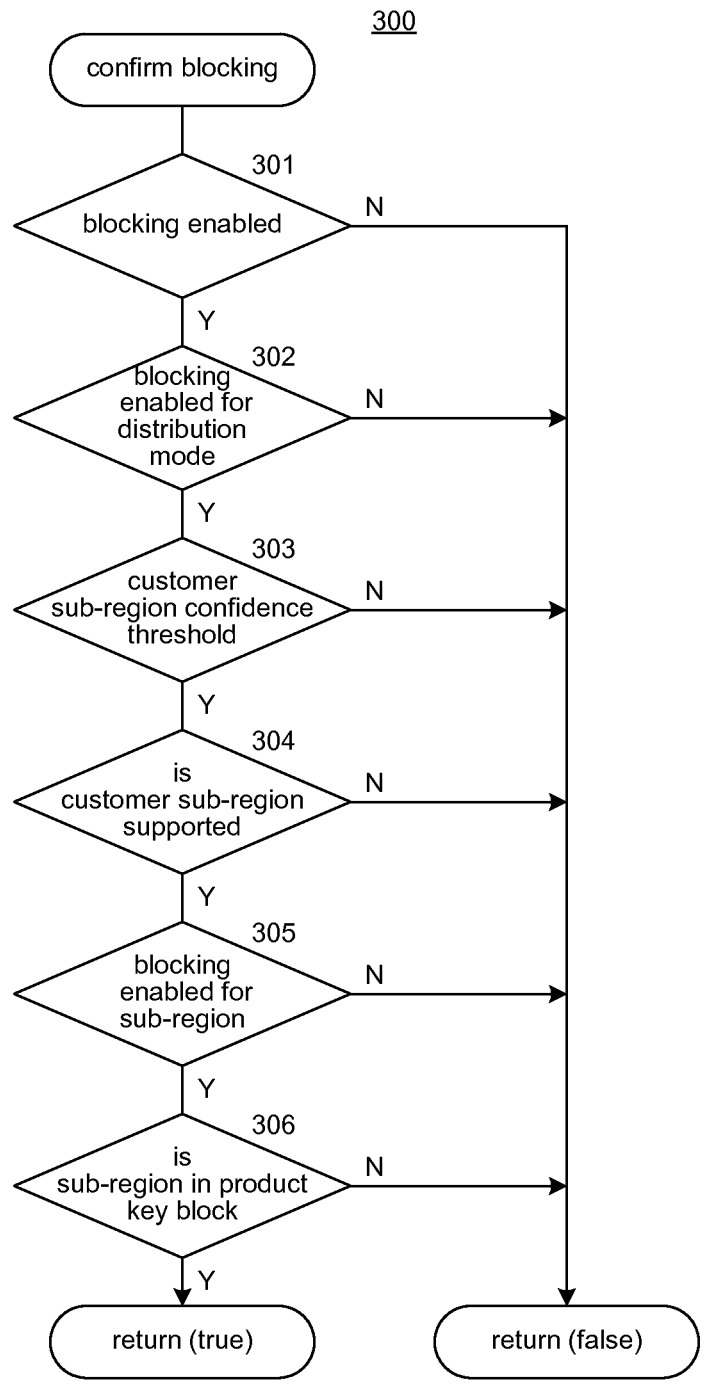
FIG. 3 is a flow diagram that illustrates the processing of the confirm blocking component of the product authorization system in some embodiments.

FIG. 3 is a flow diagram that illustrates the processing of the confirm blocking component of the product authorization system in some embodiments. The confirm blocking component is passed a product key, a distribution mode, a sub-region, and a sub-region confidence score and applies various rules to determine whether the suspected cross-region access should be blocked. Some rules may be based on sub-region and/or customer region. In decision block 301, if the blocking enabled flag is set, then blocking is enabled and the component continues at block 302, else blocking is disabled and the component returns an indication that the suspected cross-region access should not be blocked. In decision block 302, if blocking is enabled for the distribution mode, then the component continues at block 303, else the component returns an indication that the suspected cross-region access should not be blocked. In decision block 303, if the customer sub-region confidence score is greater than the threshold degree of confidence (e.g., a dynamic threshold), then the component continues at block 304, else the component returns an indication that the suspected cross-region access should not be blocked. In decision block 304, if the customer sub-region can support blocking, then the component continues at block 305, else the component returns an indication that the suspected cross-region access should not be blocked. In decision block 305, if blocking is enabled for the sub-region, then the component continues at block 306, else the component returns an indication that the suspected cross-region access should not be blocked. In decision block 306, if the sub-region is one that can be blocked based on the product key, then the component returns an indication that the suspected cross-region access should be blocked, else the component returns an indication that the suspected cross-region access should not be blocked.

Figure 4:
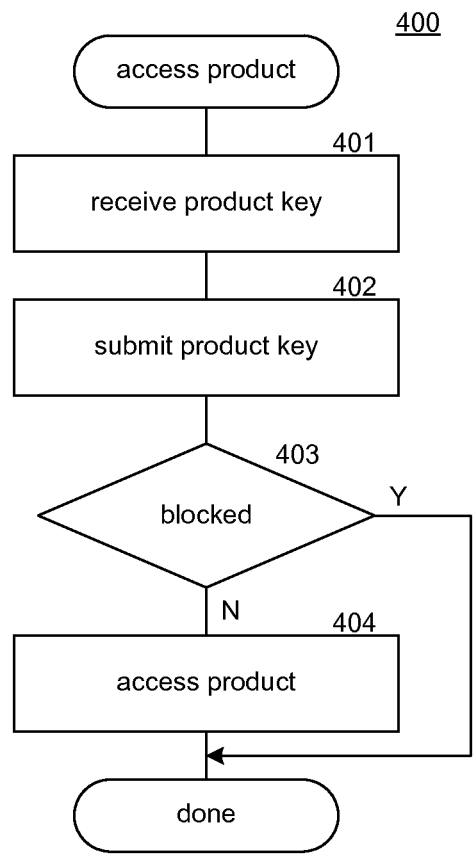
FIG. 4 is a flow diagram that illustrates the processing of the access product component of the customer system in some embodiments.

FIG. 4 is a flow diagram that illustrates the processing of the access product component of the customer system in some embodiments. The component interacts with the product authorization system to determine whether the customer is authorized to access the product associated with the product key. In block 401, the component receives the product key provided by the retailer to the customer. In block 402, the component submits the product key to the product authorization system. In decision block 403, if the product authorization system indicates that access to the product is blocked, then the component completes by blocking access and reporting an error to the customer, else the component continues at block 404. In block 404, the component allows access to the product and then completes.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for authorizing access to a product by a customer, the method comprising:
    receiving from a customer device a product key that identifies the product and a product region;
    receiving a customer address associated with the customer device;
    identifying from the customer address a customer region indicating where the customer device is located;
    determining whether the product region matches the customer region;
    when the product region matches the customer region, authorizing access to the product by the customer; and
    when the product region does not match the customer region,
        applying blocking rules to determine whether access to the product by the customer should be blocked;
        upon determining that access should be blocked, blocking access to the product by the customer; and
        upon determining that access should not be blocked, authorizing access to the product by the customer.

2. The method of claim 1 wherein the customer address is an IP address and wherein identifying the customer region includes identifying from the IP address a customer county such that the customer region is identified from the customer country.

3. The method of claim 1 including determining whether the product key has been activated and if the product key has not been activated, blocking access to the product by the customer.

4. The method of claim 1 wherein a blocking rule indicates to not block access when blocking is not enabled based on distribution mode.

5. The method of claim 1 wherein a blocking rule indicates to not block access when confidence that a customer country associated with the customer address is correctly identified is below a threshold confidence.

6. The method of claim 1 wherein countries are organized into regions and blocking is enabled a sub-region-by-sub-region basis.

7. The method of claim wherein each region is a country.

8. A computer-readable storage medium containing computer-executable instructions for controlling a computing device to authorize access to a product by a customer, the computer-executable instructions comprising instructions that:
    receive from a customer device a product key that identifies the product and product region;
    receive a customer address associated with the customer device;
    identify from the customer address a customer region indicating where the customer device is located; and
    authorize access to the product by the customer unless the product region does not match the customer region and blocking customer access is confirmed by applying a blocking rule
    so that access to the product is authorized even if the product region and the customer region do not match.

9. The computer-readable storage medium of claim 8 wherein the customer address is an IP address and wherein identifying the customer region includes identifying from the IP address a customer location such that the customer region is identified based the customer location.

10. The computer-readable storage medium of claim 8 wherein customer access to product is not authorized when the product key has not been activated.

11. The computer-readable storage medium of claim 8 wherein a blocking rule indicates to not block access when blocking is not enabled based on distribution to mode.

12. The computer-readable storage medium of claim 8 wherein a blocking rule indicates to not block access when confidence that a customer location associated with the customer address is correctly identified is below a threshold degree of confidence.

13. The computer-readable storage medium of claim 12 wherein the computer-executable instructs further comprise instructions that adjust the threshold degree of confidence to meet a target goal for limiting accesses that are not authorized.

14. The computer-readable storage medium of claim 12 wherein the threshold degree of confidence varies based on customer region.

15. The computer-readable storage medium of claim 8 wherein the customer region is selected from the group consisting of collection of countries, a country, a political division within a count , a geographic area, a collection of one or more postal codes, and collection of one or more area codes.

16. The computer-readable storage medium of claim 8 wherein a blocking rule indicates to not block access when the product key is not associated with the customer location for blocking.

17. A computing device for authorizing a customer to access a product, the computing system comprising:

a component that receives a product key that identifies the product and a product region, the product key having been activated s that access to the product can be authorized;

a component that provides the product key to authorization system wherein the authorization system identifies from a customer address associated with a computing device a customer region indicating where the computing device is located; and a component that receives n indication that access to the product by the customer has been authorized unless the authorization system determines that the product region does not match the customer region and that blocking access has been confirmed using a blocking rule se that access to the product is authorized even though the product region and the customer region do not match.

18. The computing device of claim 17 wherein the customer address is an IP address and wherein the authorization system identifies the customer region by identifying from IP address a customer location such that the customer region is identified based the customer location.

19. The computing device of 17 wherein the blocking rule indicates to not block access when blocking is not enabled based on distribution mode.

20. The computing device of clam 17 wherein the blocking rule indicates to not block access when confidence that a customer location associated with the customer address is correctly identified is below a threshold degree of confidence.

* * * * *